United States Patent [19]
Heller

[11] 3,743,246
[45] July 3, 1973

[54] FABRICATED ROUND GATE VALVE BODY
[75] Inventor: Kenneth G. Heller, Redwood City, Calif.
[73] Assignee: Walworth Company, Bala Cynwyd, Pa.
[22] Filed: May 30, 1972
[21] Appl. No.: 257,764

Related U.S. Application Data
[63] Continuation-in-part of Ser. No. 116,408, Feb. 18, 1971, abandoned.

[52] U.S. Cl. .................................. 251/367, 251/329
[51] Int. Cl. ............................................ F16k 27/00
[58] Field of Search ................... 251/367, 366, 328, 251/329

[56] References Cited
UNITED STATES PATENTS

| | | | |
|---|---|---|---|
| 2,947,511 | 8/1960 | McInnes | 251/367 X |
| 3,057,378 | 10/1962 | Fennema et al. | 251/328 X |
| 3,204,924 | 9/1965 | Bredtschmeider | 251/315 X |
| 3,442,286 | 5/1969 | Anderson et al. | 251/328 X |
| 3,518,742 | 7/1970 | Merrill et al. | 251/315 X |
| 3,580,268 | 5/1971 | Shafer | 251/315 X |
| 3,678,556 | 7/1972 | Shafer | 251/315 X |
| 3,689,026 | 9/1972 | Self | 251/315 |

*Primary Examiner*—Samuel Scott
*Attorney*—Melvin R. Stidham

[57] ABSTRACT

Disclosed is a fabricated gate valve body structure including top and bottom aligned cylindrical body tube sections adapted to accommodate a reciprocable valve gate. Hubs of circular cross-sections are disposed normal to the body tube sections. Interconnecting the hubs and body tube sections is a central section of spherical configuration, whereby both the hubs and the body sections are welded to the sphere in circular and planar welded joints. Through openings, preferably in the form of slots, are provided at the top and bottom of the sphere within the areas circumscribed by the body section joints to enable passage of the valve gate.

7 Claims, 3 Drawing Figures

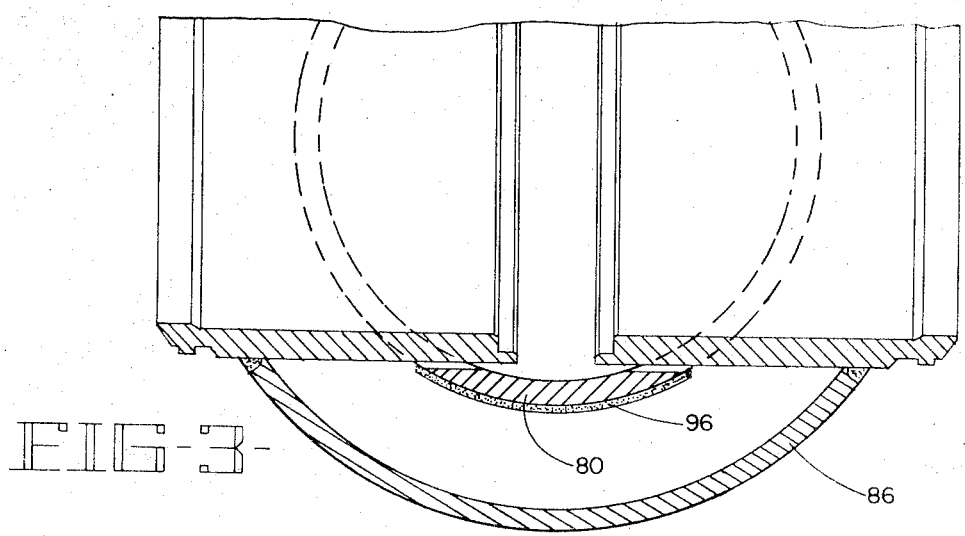
FIG-3-
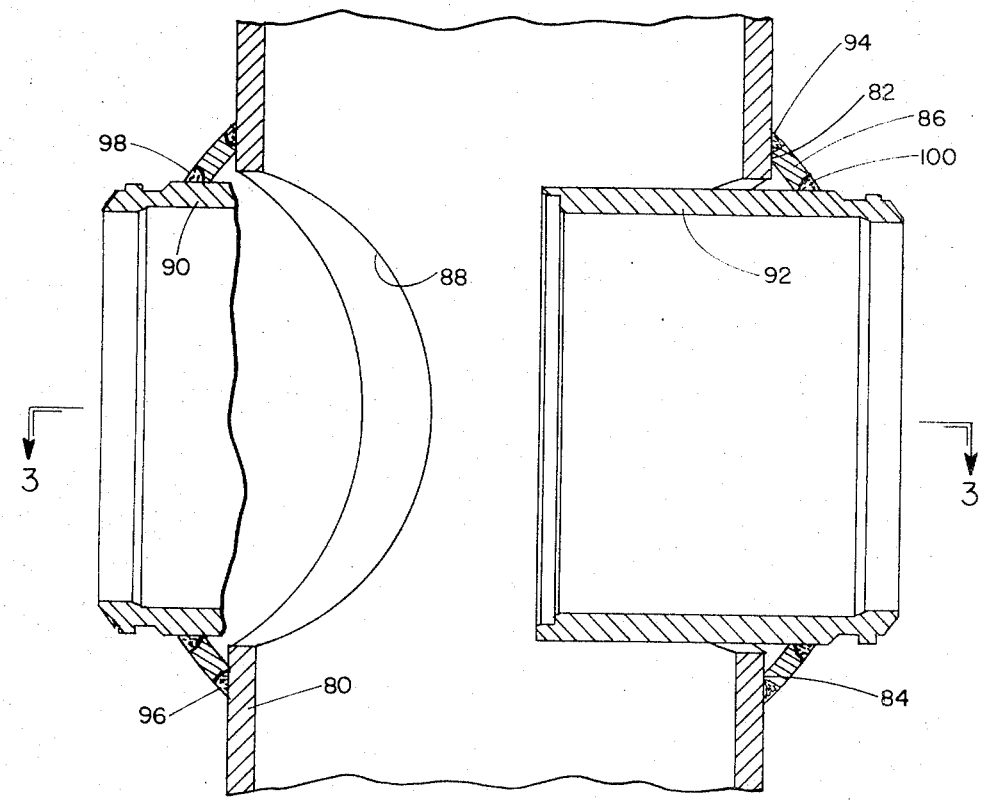
FIG-2-

FABRICATED ROUND GATE VALVE BODY

RELATED APPLICATION

This application is a continuation-in-part of my co-pending U. S. application Ser. No. 116,408 filed Feb. 18, 1971 for "Fabricated Round Valve Body Structure", and now abandoned.

BACKGROUND OF THE INVENTION

Many valve body types have been cast into circular cross-sections because such shapes constitute superior pressure vessels. Of course, a sphere is the ideal pressure vessel, but for certain valves, such as gate valves, the vertical dimension required to accommodate reciprocal movement of the valve stem and gate would render the horizontal dimension excessive. Accordingly, a spherical configuration for a gate valve is generally impractical, and where restricted by pipeline standards, which dictate limitations on the length of the valve between pipeline connections, i.e. the face-to-face dimension, a spherical configuration is unacceptable. Hence, gate valves of circular cross-section generally have cylindrical body configurations.

In recent years, there has been a wide acceptance of valve structures which are fabricated from plates, angles, and other rolled shapes. Of course, such plates and the like may be bent or rolled into a cylindrical steel body configuration but, the oddly configurated joints between such a body and the cylindrical hubs which are normal to it have generally rendered fabrication of such shapes infeasible. Specifically, the weld joints required for fabrication of a cylindrical valve body with cylindrical hubs curve through multiple planes and, therefore, are not readily welded with automatic welding equipment.

OBJECTS OF THE INVENTION

It is an object of this invention to provide a fabricated gate valve body having generally cylindrical body sections and hubs, with an intermediate spherical section to which the body sections and hubs may be welded in circular and planar joints.

It is a further object of this invention to provide a fabricated valve structure made up primarily of generally cylindrical and spherical sections.

It is a further object of this invention to provide a gate valve structure with a spherical central section and cylindrical top and bottom body sections with through openings in the spherical section just large enough to enable movement of the valve gate between the body sections and to enable installation and removal of seat assemblies.

It is a further object of this invention to provide a valve structure with a spherical central section with flow passage openings therethrough with hubs welded around the openings so as to provide substantial reinforcement to the sphere.

It is a further object of this invention to provide a gate valve structure with a spherical central section and top and bottom through openings therein to permit passage of the gate therethrough, and top and bottom body tube sections welded thereto around such openings so as to provide substantial reinforcement to the sphere.

It is a further object of this invention to provide a fabricated gate valve structure configured for superior pressure vessel characteristics with high strength to weight ratio.

Other objects and advantages of this invention will become apparent from the description to follow when read in conjunction with the accompanying drawings.

BRIEF SUMMARY OF THE INVENTION

In carrying out this invention, there are provided cylindrical upper and lower body tube sections and cylindrical tubular flow hubs disposed normal thereto. Interposed between the body tube sections and the hubs is a spherical central section to which the cylindrical members are welded in a series of circular and planar welds. Opposed flow openings in the sphere accommodate the hubs, which extend into the sphere to carry seat rings on the inner ends. Top and bottom openings are also provided to permit movement of the gate between the body sections, and, in a preferred embodiment, are in the form of slots just wide enough to receive a plate-like valve gate and to enable installation of seat rings, thus leaving as much strengthening material as possible. Those portions of the upper and lower body tube sections which are adjacent to the spherical sections are of relatively thick material to provide extra reinforcement around the gate-accommodating slots. An annular flange is welded around the top of the upper body section for attachment of a bonnet closure, and a dished bottom closure is welded around the lower end of the lower body section.

BRIEF DESCRIPTION OF THE DRAWINGS

FIG. 2 is a partial vertical section view of another embodiment; and

FIG. 3 is a partial horizontal section view taken along line 3—3 of FIG. 2.

DESCRIPTION OF PREFERRED EMBODIMENTS

The Embodiment of FIG. 1

Figure 1:
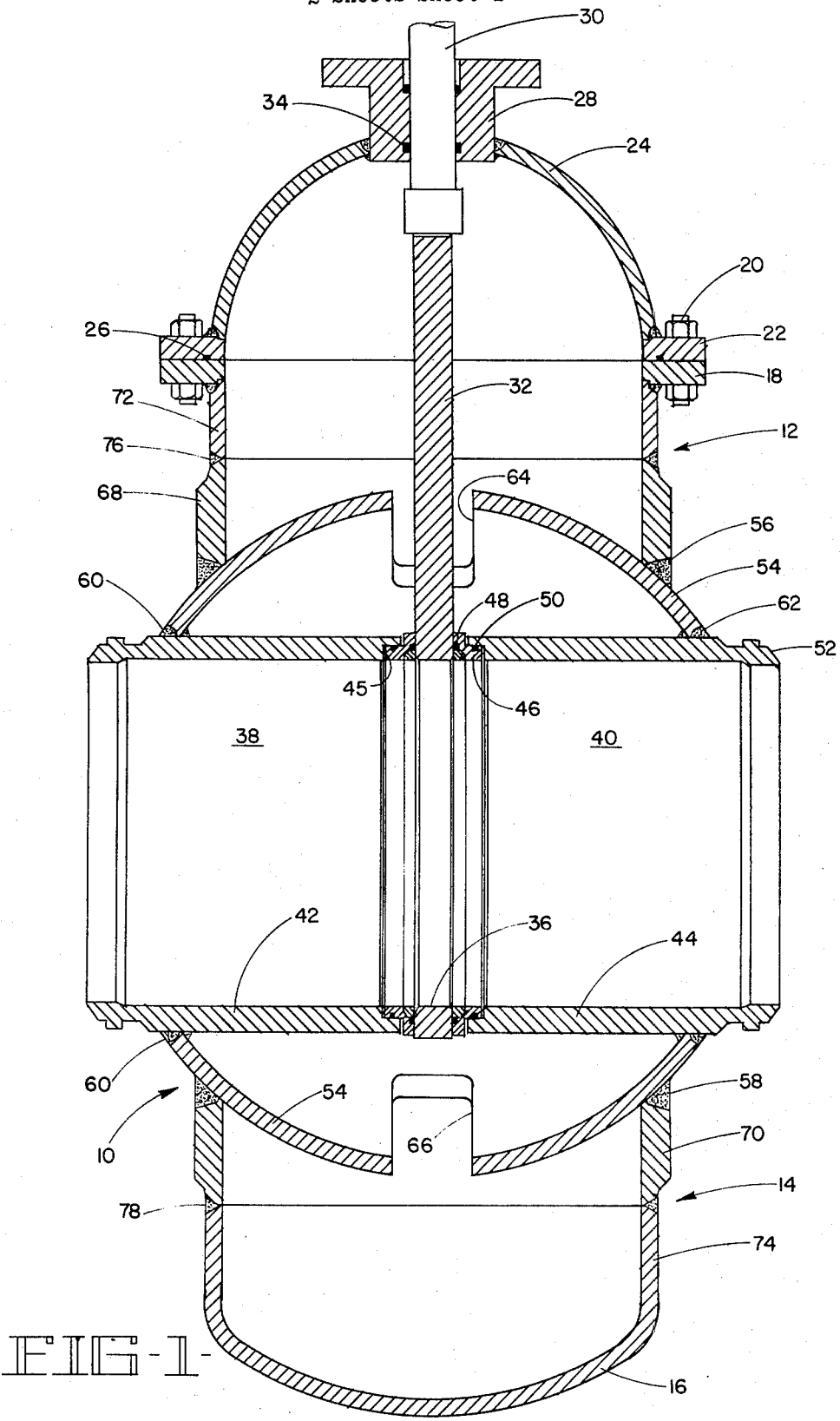
FIG. 1 is a vertical section view of a preferred embodiment of a fabricated gate valve body structure.

Referring now to FIG. 1, there is shown a gate valve 10 having a cylindrical upper body section 12 and a cylindrical lower body section 14 which may be closed by an integral dished portion 16. Welded to the upper body section 12 is a flange 18 to which is bolted at 20 a complementary flange 22 of a bonnet section 24, and suitable means such as an O-ring 26 may be interposed to seal between the upper body section 12 and the bonnet 24. Welded into the upper end of the bonnet 24 is a stem bushing 28 in which a valve stem 30 carrying a plate-like gate 32 is slidably carried. Suitable seals, such as O-rings 34 seal around the valve stem 30. The valve gate 32 has a flow opening 36 therein, which in the open position of the gate shown, registers with the flow passages 38 and 40 in upstream and downstream hubs 42 and 44. The hubs extend inwardly to planes in proximity to the gate and on their inner ends they are recessed at 45 to slidably receive seat ring assemblies 46 having resilient seal rings 48 for sealing against the gate 32 and suitable resilient seals such as O-rings 50 for sealing against the hubs. The outer ends 52 of the hubs may be formed, as shown, for a welded connection into a pipeline, or they may be provided with flanges or other means for pipeline installation. While the hubs shown are of cylindrical configuration, it is obvious that one or both may be conical along at least part of the lengths for connection to a pipe either larger or smaller than the gate flow opening 36.

Interposed between the cylindrical body sections and the cylindrical hubs is a spherical transition member 54 forming an intermediate pressure vessel. Because of the spherical configuration of the intermediate body section, the upper and lower cylindrical body section 12 and 14 may be attached to it in circular, planar welds 56 and 58. Similarly the welded connection 60 and 62 between the spherical intermediate section 54 and the hubs 42 and 44 are also circular and planar. The spherical intermediate section by enabling such circular welds, particularly adapts the structure for welding in an automatic welding machine, such as that shown in U. S. Pat. No. 2,777,937 granted Jan. 15, 1957 to Austin U. Bryant.

In order to accommodate movements of the gate from its open position shown to its closed position, wherein the through conduit 36 therein extends into the lower cylindrical body section 14, openings 64 and 66 are cut in the sphere 54 at the top and bottom thereof. Preferably, the openings are in the form of slots just wide and long enough to accommodate the gate 32, enabling a limited amount of lateral movement thereof under fluid pressure, and to permit installation and removal of the seat rings 46 through the bonnet flange 18. This minimizes the weakening of the sphere as a result of the metal removal.

In order to further strengthen the unitary structure of the valve body 10, and particularly the sphere 54 in the areas of the slots 64 and 66, those portions 68 and 70 of the upper and lower cylindrical body sections 12 and 14 which are adjacent to the sphere 54, are formed of relatively thick material. The remaining portions 72 and 74 of the upper and lower body sections 12 and 14 may be of relatively thin material to minimize weight and fabricating costs. The sections 68, 72 and 70, 74 are welded together at 76 and 78 in additional circular welds.

In addition, a considerable amount of reinforcing is provided by the hubs 42 and 44 which extend into the sphere inward of the circular welds 60 and 62 therein. Of course, those portions of the hubs in the vicinity of the weld connections with the sphere add strength to the sphere and, because there are such portions both inside and outside of the sphere additional strengthening effects are realized.

The Embodiment of FIGS. 2 and 3

In this embodiment, the upper and lower cylindrical body sections are actually portions of a single, integral cylindrical member 80 which extends completely through top and bottom circular openings 82 and 84 cut through the center spherical section 86. Lateral openings 88 are also cut through the cylindrical body 80 in order to receive the hubs 90 and 92. As in the first embodiment, all of the welds, including those 94 and 96 between the circular opening 82 and 84 and the cylindrical body 80, and those 98 and 100 around the hubs are circular and planar to facilitate fabrication.

In this embodiment, considerable strength is added to the unitary cylindrical spherical structure by reason of the continuous extent of metal along the sides of the cylindrical member 80 extending between the welds 94 and 96. Again, the extension of the hubs 90 and 92 into the sphere also contribute to the strength of the structure.

While this invention has been described in conjunction with preferred embodiments thereof, it is obvious that modifications and changes therein may be made by those skilled in the art without departing from the spirit and scope of this invention.

What is claimed is

1. A fabricated gate valve body structure comprising:
   upper and lower, aligned generally cylindrical body tube sections adapted to contain, and accommodate reciprocal movements of a valve gate.
   inlet and outlet hubs of circular cross-section disposed with the axes thereof normal to the axis of said body tube sections,
   an interconnecting central section of spherical configuration having top and bottom openings therein aligned with said body tube section and dimensioned to enable said valve gate to pass freely therethrough, and a pair of parallel, circular lateral openings therein receiving said hubs, and
   a series of planar circular welds securing and sealing said body tube sections and said hubs to said central section.

2. The valve body structure defined by claim 1 wherein:
   said top and bottom openings occupy less area than the cross-section of the body tube sections aligned therewith.

3. The valve body structure defined by claim 1 wherein:
   said top and bottom openings are in the form of relatively narrow slots in said sphere to receive a plate-like valve gate.

4. The valve body structure defined by claim 1 wherein:
   the portion of at least one of said body tube sections adjacent said central section is of relatively thick cross-section.

5. The valve body structure defined by claim 1 wherein:
   said top and bottom openings are generally circular and large enough to receive said body tube sections, and
   said body tube sections are portions of a single cylindrical tube extending completely through said central section, and including
   a pair of flow openings in said cylindrical tube aligned with said hubs.

6. The valve body structure defined by claim 1 wherein:
   said hubs extend into said central section.

7. The valve body structure defined by claim 6 wherein:
   the inner ends of said hubs are spaced apart slightly more than the width of said valve gate, and including
   recesses formed on said inner ends adapted to accommodate valve seat rings.

* * * * *